(12) United States Patent
Orsini

(10) Patent No.: US 10,611,444 B1
(45) Date of Patent: Apr. 7, 2020

(54) PERSONAL FLOTATION DEVICE WITH INFLATABLE LIGHT REFLECTIVE BALLOON AND RADAR REFLECTOR

(71) Applicant: Jean-Francois Orsini, Washington, DC (US)

(72) Inventor: Jean-Francois Orsini, Washington, DC (US)

( * ) Notice: Subject to any disclaimer, the term of this patent is extended or adjusted under 35 U.S.C. 154(b) by 0 days.

(21) Appl. No.: 16/514,886

(22) Filed: Jul. 17, 2019

Related U.S. Application Data

(63) Continuation-in-part of application No. 16/432,339, filed on Jun. 5, 2019, now Pat. No. 10,479,463.

(51) Int. Cl.
*B63C 9/125* (2006.01)
*B63C 9/08* (2006.01)
*B64B 1/40* (2006.01)

(52) U.S. Cl.
CPC .............. *B63C 9/1255* (2013.01); *B63C 9/08* (2013.01); *B64B 1/40* (2013.01)

(58) Field of Classification Search
CPC .. B63C 9/00; B63C 9/08; B63C 9/081; B63C 9/125; B63C 9/1255; B64B 1/00; B64B 1/40
USPC ................................. 441/80, 88, 89, 96, 106
See application file for complete search history.

(56) References Cited

U.S. PATENT DOCUMENTS

| | | | | |
|---|---|---|---|---|
| 6,203,390 B1 * | 3/2001 | Elliott | ........................ | B63C 9/20 441/80 |
| 6,368,174 B1 * | 4/2002 | Magee | ....................... | B63C 9/20 441/89 |
| 9,277,739 B1 | 3/2016 | Barnett | | |
| 10,479,463 B1 * | 11/2019 | Orsini | ................... | B63C 9/1255 |

FOREIGN PATENT DOCUMENTS

WO    1979000569 A1    8/1979

OTHER PUBLICATIONS https://www.amazon.com/Cartridge-Inflatable-Lifejacket-Lifesaving-Replacement/dp/B01H52EV4G.
https://www.grainger.com/search?searchBar=true&searchQuery=automatic+inflatable+life+vests.
https://www.amazon.com/QYU-Exercise-Inflatable-Commercial-Decoration/dp/B07BVGF2VR/ref=sr_1_2?keywords=inflatable+mirror+ball&qid=1559624887&s=gateway&sr=8-2.
https://www.davisinstruments.com/product/emergency-radar-reflector/.

* cited by examiner

*Primary Examiner* — Lars A Olson
(74) *Attorney, Agent, or Firm* — Chen-Chi Lin

(57) ABSTRACT

A personal flotation device having a vest, an inflatable balloon, a radar reflector, a gas cartridge, a pocket, a flap, a tube, a string, and a harness assembly. The vest comprises a first prong, a second prong opposite the first prong; and a connection member connecting the first prong to the second prong. The pocket extends from the first prong through the connection member to the second prong. The gas cartridge is disposed in the first prong of the vest. The tube connects the inflatable balloon to the gas cartridge. An end of the tube is directly attached to the inflatable balloon. The inflatable balloon is characterized by a deflated condition, stored in the pocket, and an inflated condition.

14 Claims, 6 Drawing Sheets

US 10,611,444 B1

PERSONAL FLOTATION DEVICE WITH INFLATABLE LIGHT REFLECTIVE BALLOON AND RADAR REFLECTOR

CROSS-REFERENCE TO RELATED APPLICATIONS

This Patent Application is a Continuation-in-part application of U.S. patent application Ser. No. 16/432,339 filed on Jun. 5, 2019. The disclosure made in the patent application Ser. No. 16/432,339 is hereby incorporated by reference. The disclosure made in the U.S. Pat. No. 9,277,739 to Barnett and the disclosure made in the WO1979000569A1 to Schuster are hereby incorporated by reference.

FIELD OF THE INVENTION

This invention relates generally to a personal flotation device. More particularly, the present invention relates to a personal flotation device with an inflatable light reflective balloon and a radar reflector.

BACKGROUND OF THE INVENTION

A victim floating in a river or in ocean is usually difficult to be found. The present disclosure increases the opportunity for the victim to be located.

In the present disclosure, the reflective balloon increases the buoyant force from the water. The reflective balloon and the radar reflector make it easier for a rescuer on a helicopter, a fixed-wing airplane, or a boat to locate the user of the personal flotation device. The reflective balloon and the radar reflector may be implemented in a personal flotation device, a boat, a raft, or a ditch bag.

SUMMARY OF THE INVENTION

The present invention discloses a personal flotation device having a vest, an inflatable balloon, a radar reflector, a gas cartridge, a pocket, a flap, a tube, a string, and a harness assembly. The vest comprises a first prong, a second prong opposite the first prong; and a connection member connecting the first prong to the second prong. The pocket extends from the first prong through the connection member to the second prong. The gas cartridge is disposed in the first prong of the vest. The tube connects the inflatable balloon to the gas cartridge. An end of the tube is directly attached to the inflatable balloon.

The inflatable balloon is characterized by a deflated condition, stored in the pocket, and an inflated condition. In the deflated condition, the inflatable balloon and the radar reflector are deflated; the inflatable balloon and the radar reflector are disposed in the pocket; and the flap covers an opening of the pocket. In the inflated condition, the inflatable balloon and the radar reflector are inflated by the gas cartridge; the inflatable balloon and the radar reflector are out of the pocket; and the flap is pushed aside by the tube.

DETAILED DESCRIPTION OF THE INVENTION

Figure 1:
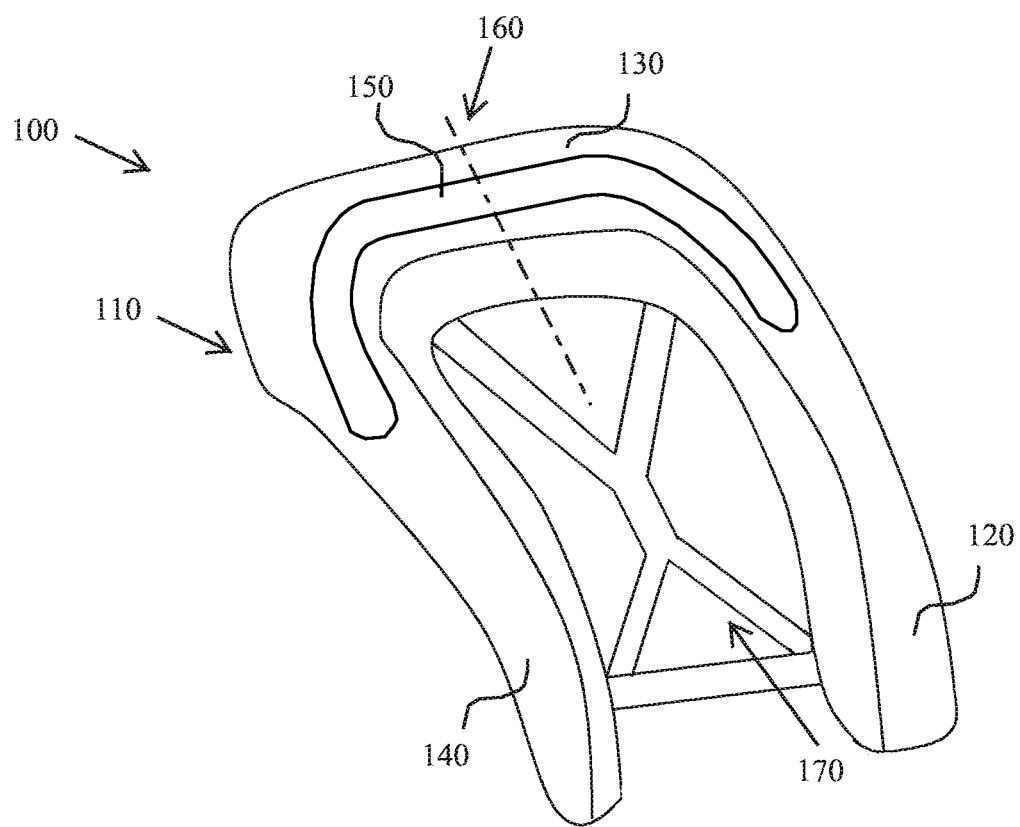
FIG. 1 is a perspective view of a personal flotation device with a deflated balloon in examples of the present disclosure.
Figure 2:
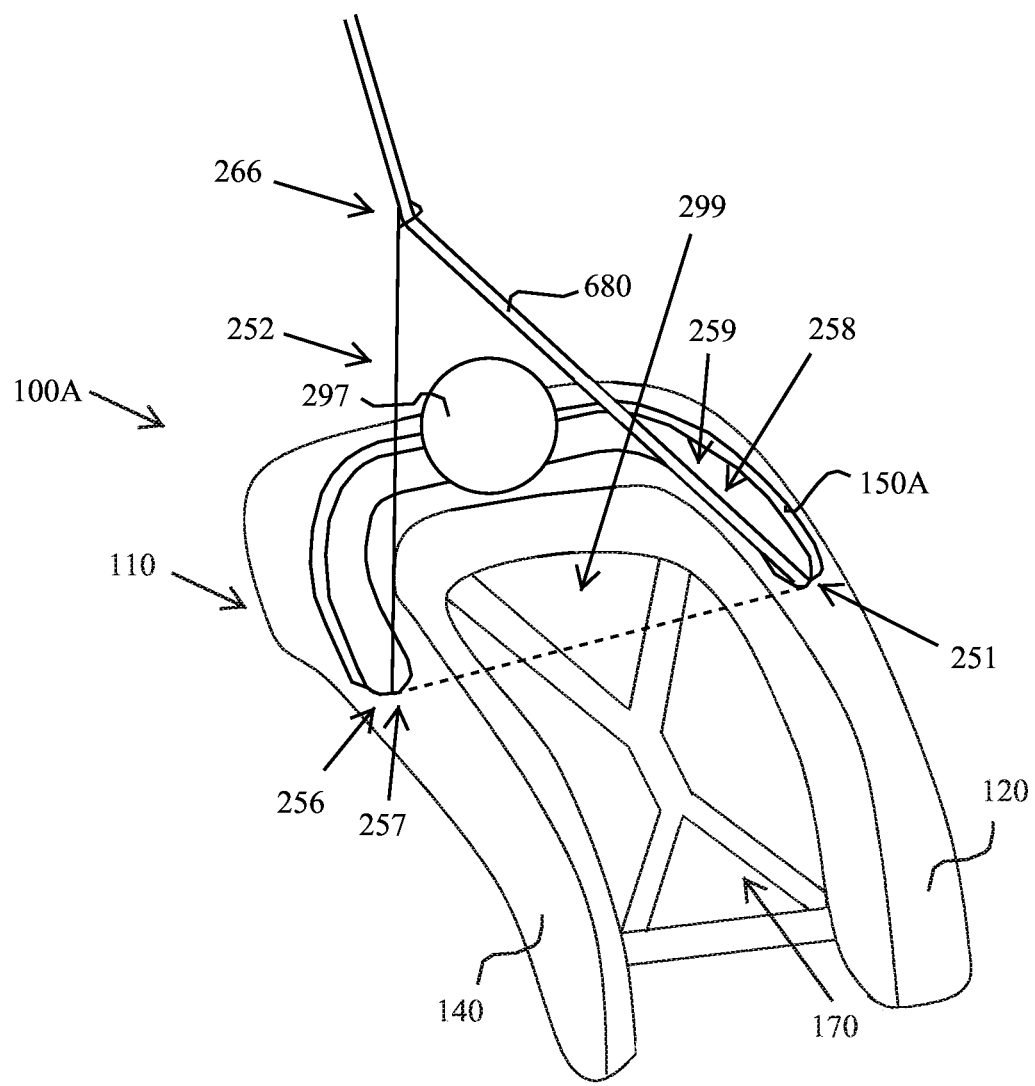
FIG. 2 is a partial, perspective view of the personal flotation device of FIG. 1 in an inflated condition in examples of the present disclosure.
Figure 3:
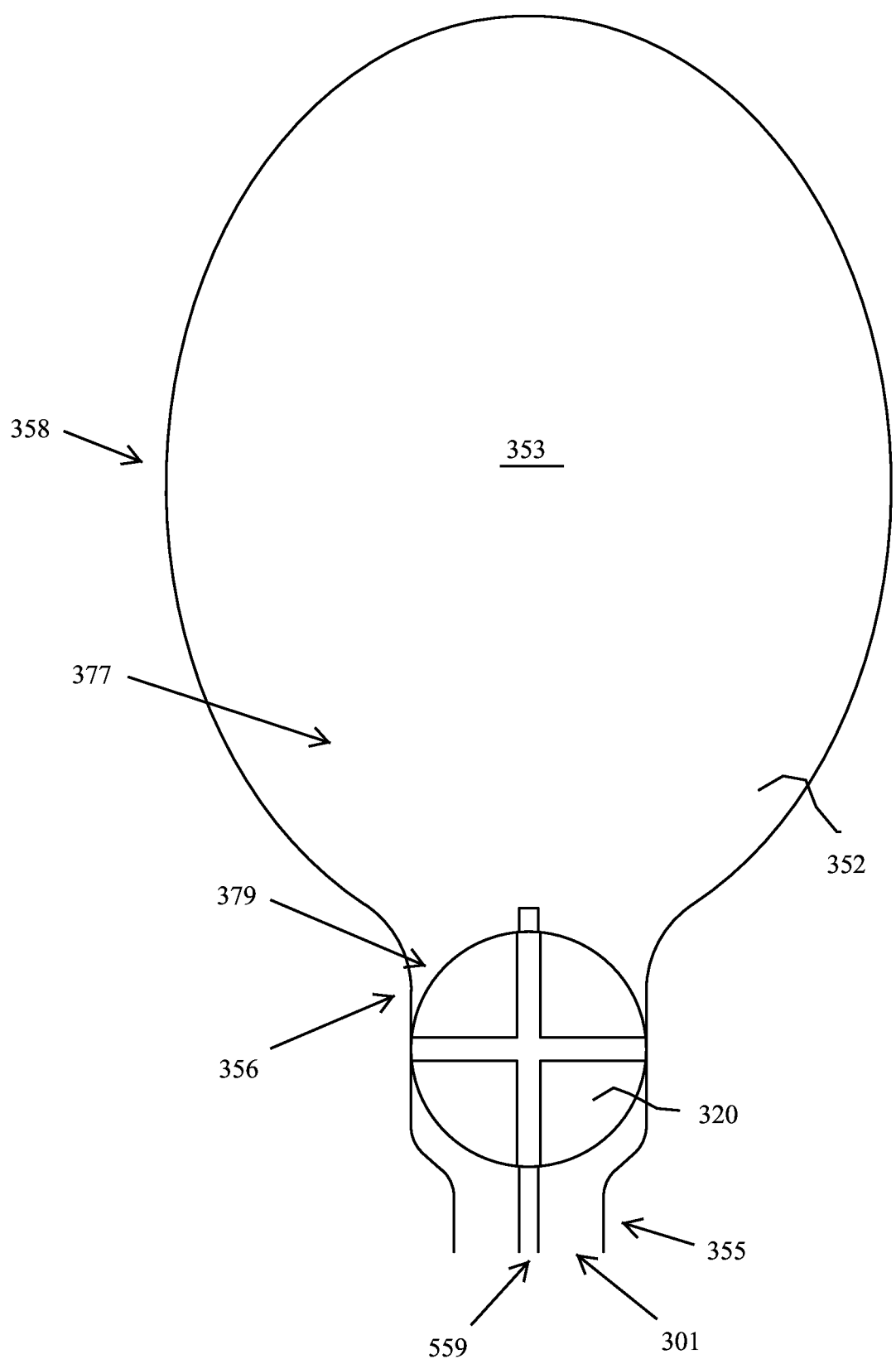
FIG. 3 is a front view of an inflated balloon and an inflated radar reflector in examples of the present disclosure.
Figure 6:
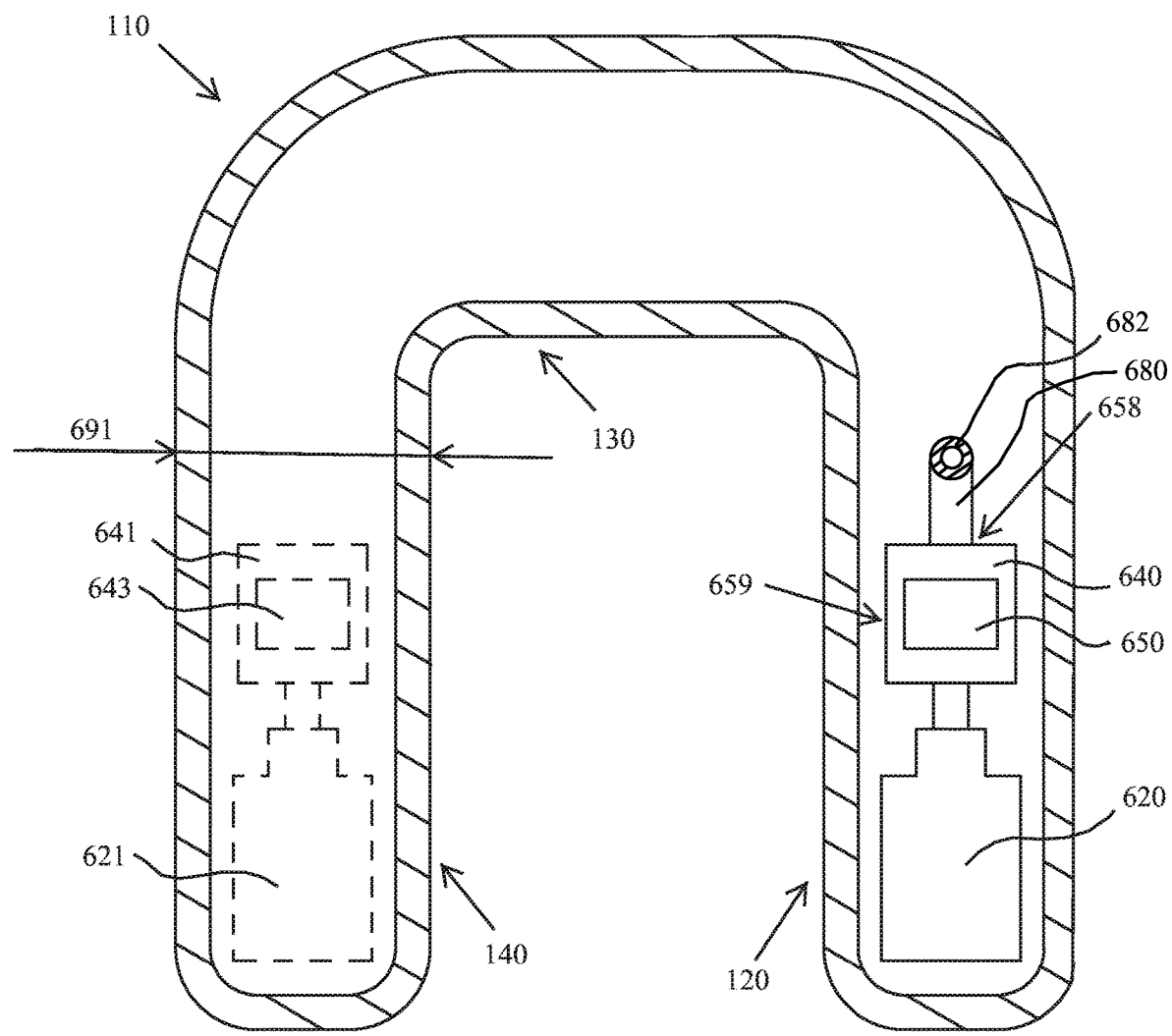
FIG. 6 is a cross sectional view of a vest in examples of the present disclosure.

FIG. 1 is a perspective view of a personal flotation device 100 with a deflated balloon under a flap 150 in examples of the present disclosure. FIG. 2 is a partial, perspective view and FIG. 3 is a partial, front view of the personal flotation device 100A whiling the balloon 352 and the radar reflector 320 being inflated in examples of the present disclosure. FIG. 6 is a cross sectional view, cutting along a plane perpendicular to the plane 160, of a vest in examples of the present disclosure. The personal flotation device 100 with a deflated balloon of FIGS. 1 and 100A with an inflated balloon 352 and an inflated radar reflector 320 of FIG. 2 and FIG. 3 comprises a vest 110, an inflatable balloon 352, a radar reflector 320, a gas cartridge 620 of FIG. 6, a pocket 258, a flap 150, a tube 680 of FIG. 6, a string 252 of FIG. 2, and a harness assembly 170 attached to the vest 110. The vest 110 comprises a first prong 120, a second prong 140 opposite the first prong; and a connection member 130 connecting the first prong 120 to the second prong 140. The pocket 258 extends from the first prong 120 through the connection member 130 to the second prong 140. In the deflated condition, the pocket is covered by a flap 150. The gas cartridge 620 is disposed in the first prong 120 of the vest 110. The tube 680 connects the inflatable balloon 352 to the gas cartridge 620. In examples of the present disclosure, a portion 682 of the tube 680 is directly attached to a first end 251 of the pocket 258.

In examples of the present disclosure, in the inflated condition, a first end 256 of the string 252 is attached to a second end 257 of the pocket 258. A second end 266 of the string 252 is attached to the tube 680. The first end 256 of the string 252, the second end 266 of the string 252, and the first end 251 of the pocket 258 define three vertices of a triangle 299. Three sides of the triangle 299 are configured to surround a head 297 of a user in the inflated condition so that the head 297 of the user is above a water surface. The construction of triangle 299 would automatically move the user with the mouth up. It is a very important feature for an unconscious user.

The inflatable balloon 352 and the radar reflector 320 are characterized by a deflated condition, stored in the pocket 258, of FIG. 2 and an inflated condition of FIG. 2. In the deflated condition, the inflatable balloon 352 and the radar reflector 320 are deflated; the inflatable balloon 352 and the radar reflector 320 are disposed in the pocket 258; and the flap 150 covers an opening 259 of the pocket 258. In the inflated condition, the inflatable balloon 352 and the radar reflector 320 are inflated by the gas cartridge 620; the inflatable balloon 352 and the radar reflector 320 are out of the pocket 258; and the flap 150A is pushed aside by the inflated balloon 352.

In FIG. 6, in examples of the present disclosure, the gas cartridge 620 contained pressurized carbon dioxide. In one example, the inflated balloon is of an ovoid shape (inflatable balloon 352 of FIG. 3). In another example, the inflated balloon is of a sphere shape (a special case of an ovoid shape). In one example, a diameter of the sphere shape of the inflated balloon is sixty centimeters. The volume of the balloon is 113,040 cubic centimeters. It requires a gas cartridge 620 contained pressurized carbon dioxide in a liquid form of 150 to 250 cubic centimeters.

In examples of the present disclosure, the inflatable balloon 352 is light, less than five ounces. In examples of the present disclosure, a volume of the inflated balloon 352 is larger than a volume of the vest 110. In examples of the present disclosure, the vest 110 is made of nylon.

In examples of the present disclosure, the gas cartridge 620 contained pressurized helium. In one example, the inflated balloon is of an ovoid shape (inflatable balloon 352 of FIG. 3). In another example, the inflated balloon is of a sphere shape (a special case of an ovoid shape). In one example, a diameter of the sphere shape of the inflated balloon is sixty centimeters. The volume of the balloon is 113,040 cubic centimeters. It requires a gas cartridge 620 contained pressurized helium in a liquid form of 1,700 to 1,800 cubic centimeters.

MUSTANG SURVIVAL Inflatable Life Jacket indicates that the Jacket automatically inflates when submerged in four or more inches of water.

In examples of the present disclosure, the gas cartridge 620 comprises an actuator 640 comprising a pressure sensor 650 and a hydrostatic valve 658 at the interface of the tube 680 and the actuator 640. The actuator 640 is actuated when the gas cartridge 620 is submerged under water and water pressure is larger than a threshold value. Then, the actuated actuator 640 triggers the gas cartridge 620 to fill the inflatable balloon 352 and the radar reflector 320. In one example, the hydrostatic valve 658 opens when the pressure value measured by the pressure sensor 650 exceeds the threshold value. In one example, the threshold value is in a range from 14.8 psi to 15.0 psi. In examples of the present disclosure, a length of the gas cartridge 620 is in a range from 3.8 to 4.2 inches. A length of the actuator 640 is in a range from 1.8 to 2.2 inches.

In another example, the actuator 640 contains a dissolvable tablet. The dissolvable tablet dissolves while submerging in water in less than a predetermined time period. In examples of the present disclosure, the predetermined time period is ten seconds.

A water density in a river is less than a water density in ocean. In one example, the actuated actuator 640 actuated by the pressure sensor 650 at a first depth in a river is larger than a second depth in ocean.

In one example, the vest 110 is non-inflatable. In another example, the vest 110 is inflatable. A width 691 of the second prong 140 of an inflatable vest is narrower than a width of the second prong of a non-inflatable vest. In examples of the present disclosure, the width 691 of the second prong 140 of an inflatable vest is in a range from 8 centimeters to 16 centimeters. The width of the second prong of a non-inflatable vest is in a range from 17 centimeters to 24 centimeters.

In examples of the present disclosure, the vest 110 is an inflatable vest. The vest 110 is characterized by a deflated condition and an inflated condition. In the deflated condition, the first prong 120, the connection member 130, and the second prong 140 are deflated. In the inflated condition, the first prong 120, the connection member 130, and the second prong 140 are inflated by the gas cartridge 620 through an openable side hole 659 of actuator 640 controlled by the pressure sensor 650.

In examples of the present disclosure, in FIG. 6, an optional gas cartridge (shown in dashed lines) disposed in the second prong 140. The vest 110 is an inflatable vest. The vest 110 is characterized by a deflated condition and an inflated condition. In the deflated condition, the first prong 120, the connection member 130, and the second prong 140 are deflated. In the inflated condition, the first prong 120, the connection member 130, and the second prong 140 are inflated by the gas cartridge 621 through an openable top hole 643 of actuator 641.

In examples of the present disclosure, an outer surface 353 of an upper portion 358 of the inflatable balloon 352 is reflective similar to a mirror. An outer surface of a lower portion 356 of the inflatable balloon 352 is not reflective so not to block radar waves to reach the radar reflector 320. The reflective balloon make it easier for a rescuer on a helicopter, a fixed-wing airplane, or a boat to locate the user of the personal flotation device 100A. The outer surface 353 has a reflectivity larger than 80% under a normal incidence of light having a wavelength in the range from 380 nm to 740 nm. In examples of the present disclosure, a plurality of coating layers are applied to the outer surface 253 of the inflatable balloon 352 so as to achieve the reflectivity. At least one of the plurality of coating layers is magnesium fluoride.

In examples of the present disclosure, the gas cartridge 620 and the gas cartridge 621 are symmetric with respect to a center plane 160 passing through a centroid of the pocket 258. The harness assembly 170 is symmetric with respect to the center plane 160. The vest 110 is symmetric with respect to the center plane 160. The inflatable balloon 352 is symmetric with respect to the center plane 160.

In example of the present disclosure, an inlet 301 of the balloon 352 includes an inflation valve to facilitate pumping gas into the balloon and keeping the gas in the balloon with minimal leakage (for example, last for more than seven days). The inflation valve may be similar to a basketball valve or a tire valve.

Figure 4:
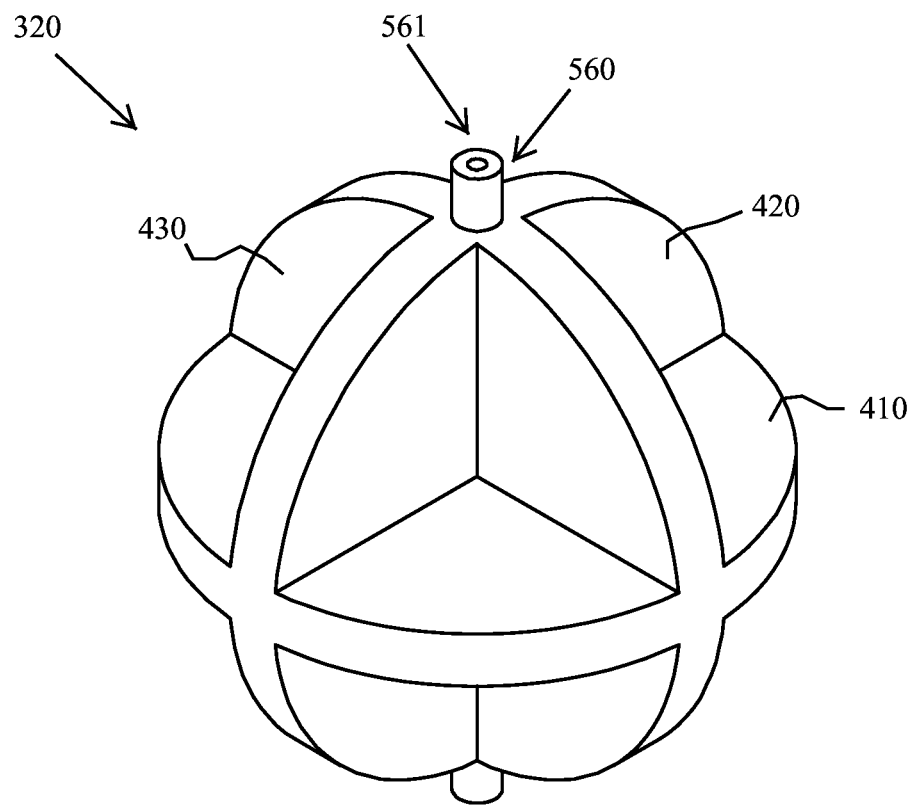
FIG. 4 is a perspective view of the radar reflector in examples of the present disclosure.

FIG. 4 is a perspective view of the radar reflector 320 in examples of the present disclosure. In examples of the present disclosure, a size of the inflatable balloon 352 is larger than a size of the radar reflector 320. The radar reflector 320 comprises a first disk 410, a second disk 420, and a third disk 430. The second disk 420 is perpendicular to the first disk 410. The third disk 430 perpendicular to the first disk 410 and the second disk 420.

Figure 5:
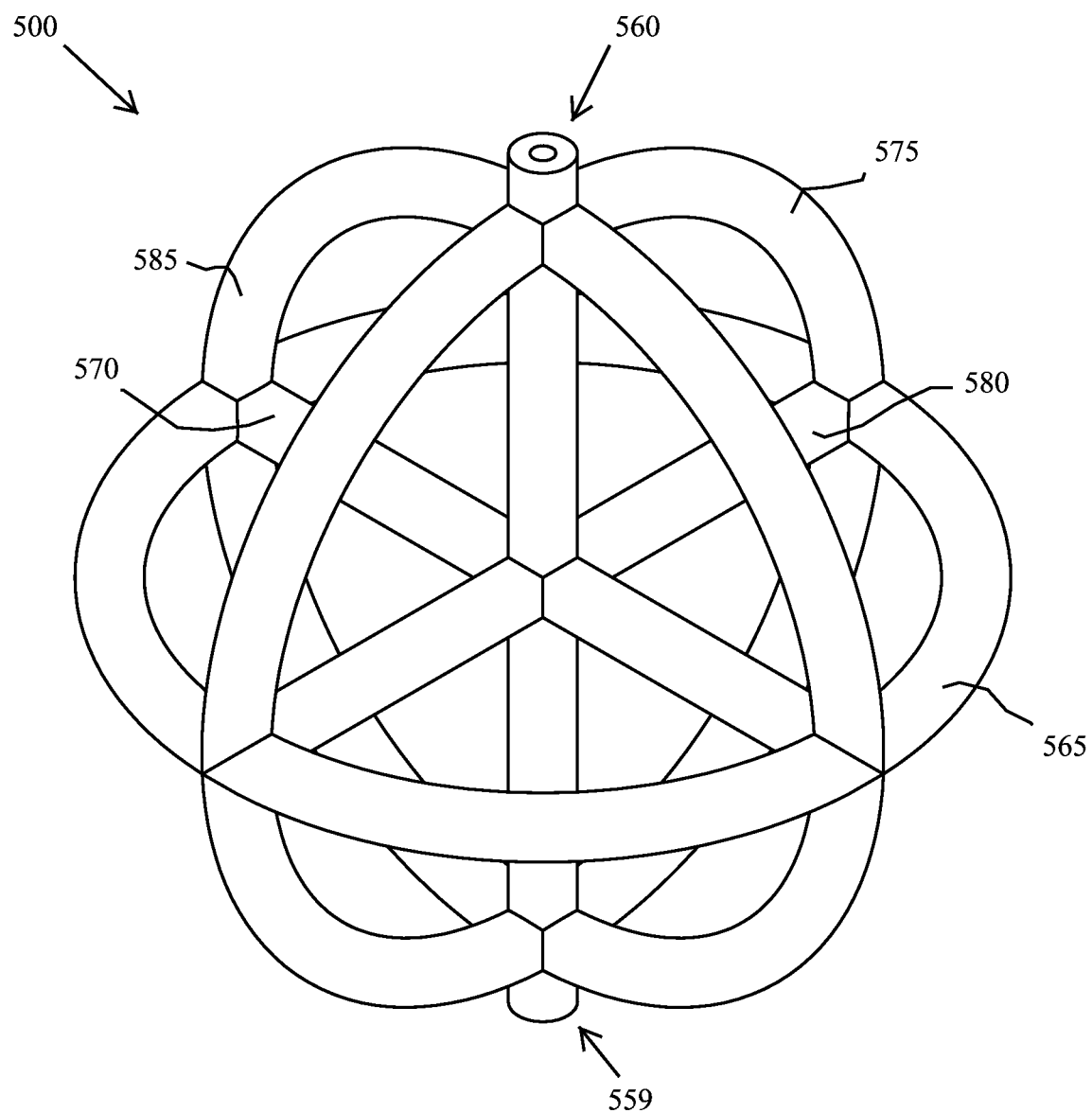
FIG. 5 is a perspective view of nested tubes of the radar reflector in examples of the present disclosure.

FIG. 5 is a perspective view of nested tubes 500 of the radar reflector 320 in examples of the present disclosure. The nested tubes 500 comprises a first straight tube 560, a second straight tube 570, a third straight tube 580, a first arc tube 565, a second arc tube 575, and a third arc tube 585. The second straight tube 570 is perpendicular to the first straight tube 560. The third straight tube 580 is perpendicular to the first straight tube 560 and the second straight tube 570. The first arc tube 565 is along an outer peripheral of the first disk 410. The second arc tube 575 is along an outer peripheral of the second disk 420. The third arc tube 585 is along an outer peripheral of the third disk 430.

In examples of the present disclosure, the nested tubes 500 are disposed within the first disk 410, the second disk 420, and the third disk 430 except that the inlet 559 and the outlet 561 of the first straight tube 560.

In examples of the present disclosure, a framework of the radar reflector 320 is made of inflatable tubes which are stretched metallic materials, metallic fabric materials, or "solar Mylar materials" (the metallic emergency blanket material that is not really a fabric). In examples of the present disclosure, the radar reflector 320 is an octahedral reflector and the radar deflector 320 is 5 meters up in the air in the inflated condition.

In examples of the present disclosure, referring now to FIG. 3, the radar reflector 320 is disposed at a lower portion 379 of an internal cavity 377 of the inflatable balloon 352 in the inflated condition. An inner wall of the lower portion 379 of an internal cavity 377 of the inflatable balloon 352 holds and keeps the radar reflector 320 in place.

In examples of the present disclosure, the inflatable balloon 352 and the radar reflector 320 are made of a layer of PVC and a layer of aluminum, woven and non-woven fabric surrounded by aluminum foils, or vaporized aluminum of the fabric.

In examples of the present disclosure, referring now to FIG. 3 and FIG. 5, an inlet 559 of the first straight tube 560 of the radar reflector 320 is within an inlet 301 of the inflatable balloon 352 in the inflated condition. In examples of the present disclosure, in the beginning of the helium filling process, a bottom portion 355 of the balloon 352 closes up on the bottom of the radar reflector 320. No gap between the inner surface of the bottom portion 355 of the balloon 352 and the outer surface of the first straight tube 560 near the inlet 559. The inlet 301 of the inflatable balloon 352 closes up the inlet 559 of the first straight tube 560 of the radar reflector 320. The helium fills up the balloon 352 by first being conducted through the first straight tube 560.

Those of ordinary skill in the art may recognize that modifications of the embodiments disclosed herein are possible. For example, a shape of the inflatable balloon may vary. Other modifications may occur to those of ordinary skill in this art, and all such modifications are deemed to fall within the purview of the present invention, as defined by the claims.

The invention claimed is:

1. A personal flotation device comprising:
   a vest comprising:
      a first prong;
      a second prong opposite the first prong;
      a connection member connecting the first prong to the second prong;
      a pocket; and
      a flap;
   an inflatable balloon;
   a radar reflector;
   a gas cartridge disposed in the first prong of the vest;
   a tube connecting the inflatable balloon and the radar reflector to the gas cartridge; and
   a harness assembly attached to the vest;
   wherein the inflatable balloon and the radar reflector are characterized by
      a deflated condition in which
         the inflatable balloon and the radar reflector are deflated;
         the inflatable balloon and the radar reflector are disposed in the pocket; and
         the flap covers an opening of the pocket; and
      an inflated condition in which
         the inflatable balloon and the radar reflector are inflated by the gas cartridge;
         the inflatable balloon and the radar reflector are out of the pocket; and
         the flap is pushed aside by the tube.

2. The personal flotation device of claim 1, wherein the gas cartridge contained pressurized helium.

3. The personal flotation device of claim 2, wherein the gas cartridge comprises an actuator;
   wherein the actuator is actuated when the gas cartridge is submerged under water and water pressure is larger than a threshold value;
   wherein the actuated actuator triggers the gas cartridge to fill the inflatable balloon and the radar reflector.

4. The personal flotation device of claim 1, wherein an outer surface of the inflatable balloon is reflective having a reflectivity larger than 80% under a normal incidence of light having a wavelength in a range from 380 nm to 740 nm.

5. The personal flotation device of claim 1 further comprising a string;
   wherein a first end of the string is attached to a second end of the pocket;
   wherein a second end of the string is attached to the tube;
   wherein the first end of the string, the second end of the string, and a first end of the pocket define three vertices of a triangle; and
   wherein three sides of the triangle configured to surround a head of a user in the inflated condition so that the head of the user is above a water surface.

6. The personal flotation device of claim 1, wherein the gas cartridge contained pressurized carbon dioxide.

7. The personal flotation device of claim 1, wherein a size of the inflatable balloon is larger than a size of the radar reflector.

8. The personal flotation device of claim 1, wherein the vest is an inflatable vest and the vest is characterized by
   a deflated condition in which
      the first prong, the connection member, and the second prong are deflated; and
   an inflated condition in which
      the first prong, the connection member, and the second prong are inflated by the gas cartridge.

9. The personal flotation device of claim 1 further comprising an other gas cartridge disposed in the second prong;
   wherein, the vest is an inflatable vest and the vest is characterized by
      a deflated condition in which
         the first prong, the connection member, and the second prong are deflated; and
      an inflated condition in which
         the first prong, the connection member, and the second prong are inflated by the other gas cartridge.

10. The personal flotation device of claim 9, wherein the gas cartridge and the other gas cartridge are symmetric with respect to a center plane passing through a centroid of the pocket;
    wherein the harness assembly is symmetric with respect to the center plane;
    wherein the vest is symmetric with respect to the center plane; and
    wherein the inflatable balloon is symmetric with respect to the center plane.

11. The personal flotation device of claim 1, wherein the radar reflector comprises
    a first disk;
    a second disk perpendicular to the first disk; and
    a third disk perpendicular to the first disk and the second disk.

12. The personal flotation device of claim 11, wherein the radar reflector further comprises
    a plurality of nested tubes comprising
       a first straight tube;
       a second straight tube perpendicular to the first straight tube;
       a third straight tube perpendicular to the first straight tube and the second straight tube;
       a first arc tube along an outer peripheral of the first disk;
       a second arc tube along an outer peripheral of the second disk; and a third arc tube along an outer peripheral of the third disk.

13. The personal flotation device of claim 12, wherein the radar reflector is disposed at a lower portion of an internal cavity of the inflatable balloon in the inflated condition.

14. The personal flotation device of claim 13, wherein an inlet of the first straight tube of the radar reflector in within an inlet of the inflatable balloon in the inflated condition.

\* \* \* \* \*